July 9, 1957     H. T. BLUM     2,798,473
SAW BLADE FOR STONE CUTTING MACHINE
Filed May 25, 1956     2 Sheets-Sheet 1
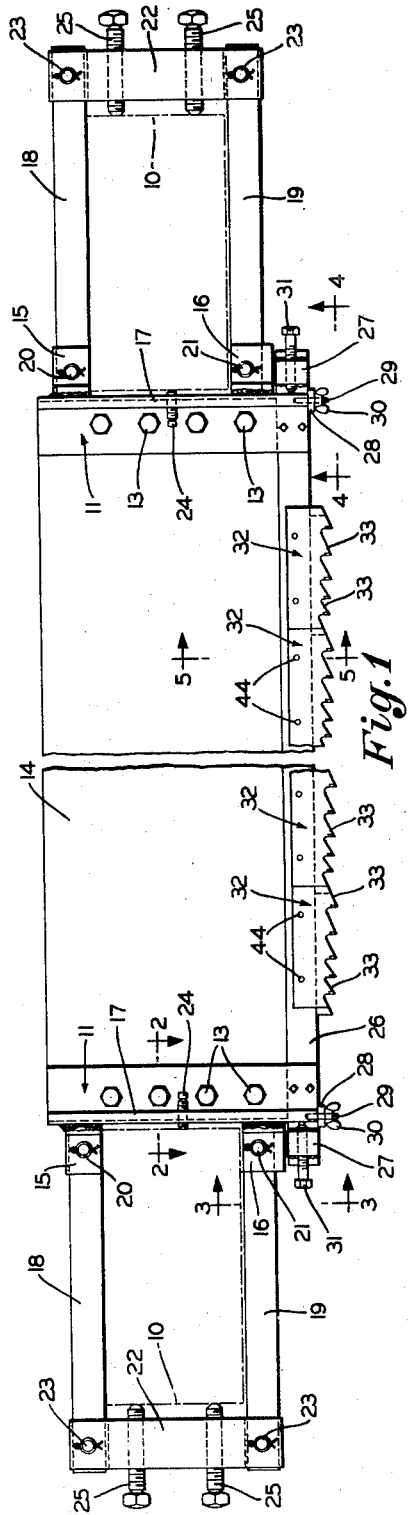
INVENTOR.
Harold T. Blum
BY
Frease & Bishop
ATTORNEYS

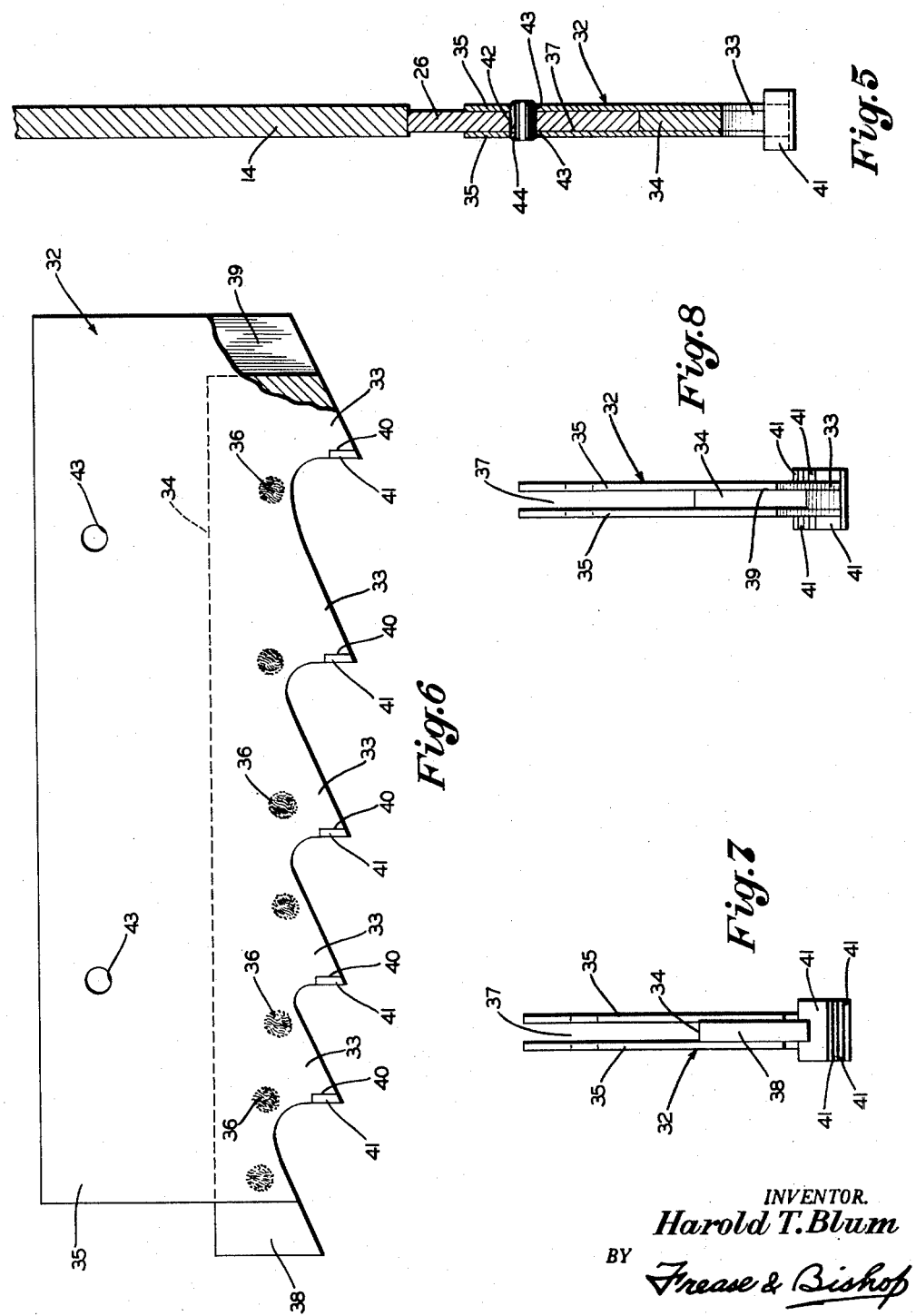

2,798,473
SAW BLADE FOR STONE CUTTING MACHINE

Harold T. Blum, Millersburg, Ohio, assignor to The Briar Hill Stone Company, Glenmont, Ohio, a corporation of Ohio Application May 25, 1956, Serial No. 587,417

5 Claims. (Cl. 125—17)

The invention relates to saw blades for cutting stone, and more particularly to saw blades especially adapted for use in gang saw stone cutting machines of the general type disclosed in my prior Patent No. 2,720,199 and No. 2,720,200, dated October 11, 1955.

These machines are adapted for cutting large blocks of stone, each weighing several tons, into a plurality of slabs of desired thickness. In such machines, the saw blades are steel plates with hardened teeth inserts in one edge. A plurality of these saw blades are mounted in a gang saw frame which is continuously moved in a circular path and moved vertically relative to the block of stone, cutting vertical kerfs in the stone, separating it into a plurality of slabs.

Blades of this general type are shown in my copending application Serial No. 538,847, filed October 6, 1955, now Patent No. 2,775,236, issued December 25, 1956. Each of these blades comprises a heavy gauge steel plate of considerable width, having hardened teeth individually inserted in one edge thereof. It has been impossible to get enough tension on these big stiff blades to stretch them perfectly tight.

The present invention contemplates certain improvements in such saw blades which overcome this difficulty. This is accomplished by providing a relatively narrow, saw blade with teeth inserts thereon, and mounting it below a relatively wide back-up blade or plate, whereby the narrow blade may be stretched as tight as a fiddle string so as to produce a perfectly straight cut.

The tooth insert units each comprises a similar group of teeth, and these units are of channel shape so as to fit over one edge of the blade.

It is therefore an object of the invention to provide a gang saw blade which may be stretched tightly.

Another object is to provide such a saw blade in which an entire group of teeth may be easily and readily removed and replaced.

A further object is to provide a saw blade of the character referred to comprising an elongated steel plate of relatively narrow width, having insert tooth units detachably connected to one edge, the other edge of the blade contacting a back-up plate of relatively great width.

A still further object is to provide a gang saw blade of this type in which the insert tooth units are of channel cross-section and are detachably mounted upon one edge of the blade.

The above objects together with others which will be apparent from the drawings and following description, or which may be later referred to, may be attained by constructing the improved saw blade in the manner hereinafter described in detail, and illustrated in the accompanying drawings.

In general terms, the invention may be stated as comprising a gang saw blade for cutting stone, the blade being in the form of an elongated relatively narrow, steel plate having means at its ends for mounting it under tension in a gang saw frame.

The saw teeth are in the form of unit inserts, each comprising a similar group of teeth with facings of carboloy or similar material. Each of these insert units is of channel cross section, so as to be easily and readily mounted upon one edge of the saw blade, roll pins being located through suitably located apertures in the insert units and the steel blade for detachably connecting the inserts. This relatively narrow saw blade is backed up by a relatively wide steel plate mounted in the gang saw frame.

Thus, when it may become necessary to remove or replace a blade, it is only necessary to remove the relatively narrow steel plate with the tooth insert units therein, without disturbing the relatively wide back-up plate. In the same manner, if it is necessary to remove any group of teeth for sharpening or replacing, it is only necessary to knock out the roll pins holding that particular insert unit.

Having thus described the invention in general terms, reference is now made to the accompanying drawings, illustrating a preferred embodiment of the invention, in which:

Fig. 1 is a side elevation of a gang saw blade constructed in accordance with the invention, showing the blade mounted in a gang saw frame with back-up plate, with central portion broken away;

Fig. 2 is an enlarged fragmentary sectional view showing attachment of the back-up plate to the gang saw frame, taken on line 2—2, Fig. 1;

Fig. 3 is an enlarged fragmentary sectional view taken on line 3—3, Fig. 1;

Fig. 4 is an enlarged fragmentary bottom plan view of the frame, viewed as upon line 4—4, Fig. 1;

Fig. 5 is an enlarged transverse sectional view through the saw blade and back-up plate, taken on the line 5—5, Fig. 1;

Fig. 6 is an enlarged, detached side elevation of one of the tooth insert units;

Fig. 7 is an end view of one end of the tooth insert unit, viewed as from the left-hand end of Fig. 6; and Fig. 8 is an end view of the other end of the tooth insert unit.

Referring now in detail to the embodiment of the invention shown in the drawings, in which similar numerals refer to similar parts throughout the several views, the box beams of a gang saw frame are indicated in broken lines at 10—10 in Fig. 1.

Each saw blade is attached at opposite ends to a frame connected to the adjacent box beam 10, said frame including a pair of angle members 11—11, the abutting flanges 12 of which are perforated to receive the clamping bolts 13.

Opposite ends of the back-up plate or blade 14 are similarly perforated, whereby they may be clamped between the flanges 12—12 of the angle members 11—11, as best shown in Fig. 2.

Top and bottom angle lugs 15 and 16 respectively are welded to the outer sides of the aligned flanges 17—17 of the angle members 11—11. Upper and lower horizontal bars 18 and 19 respectively have their inner ends located between the angle lugs 15 and 16 respectively, and attached thereto by the pins 20 and 21 respectively.

As seen in Fig. 1, the angle members 11—11 are positioned upon the inner side of the box beam 10, the upper horizontal bar 18 and lower horizontal bar 19 being located above and below the box beam and extending beyond the outer side thereof, where they are connected to the vertical bar 22 by the pins 23.

Set screws 24 are threaded through the flanges 17 of the angle members 11—11, and engage the inner sides of the box beams 10, and set screws 25 are threaded through the vertical bars 22 and engage the outer sides of the box beams, whereby the saw blades may be attached to the gang saw frame, and tension may be adjusted upon the saw blades as desired.

Each saw blade proper is in the form of a relatively narrow steel blade 26, located against the lower edge of the back-up plate 14. Opposite ends of the blade 26 are located between the lower ends of the angle members 11—11, and blocks 27 are welded upon opposite sides of each end of the blade.

A locking bar 28 is located across the lower ends of each pair of angle members 11—11, and beneath the saw blade 26, and attached to the angle members, as by the screws 29 and wing nuts 30, thus retaining the saw blade 26 in contact with the lower edge of the back-up plate 14.

Tension may be independently adjusted upon the saw blade 26, by means of the set screws 31, threaded through the blocks 27 and engaging the outer surfaces of the angle members 11, forcing the ends of the blade 26 in opposite directions and thus stretching the blade.

The tooth insert units are indicated generally at 32, and each unit has a similar group of teeth thereon, whereby the insert units are entirely interchangeable throughout the length of the blade. As shown in my copending application above referred to, the teeth 33 of each unit may be variably spaced so that only one tooth in each group will make contact with the stone at the same time, whereby the shocks, stresses and strains upon the blade will be distributed over each stroke of the blade.

As best shown in Fig. 6, the teeth 33 are not only located at progressively increasing distances from left to right, throughout the length of each insert unit, but they are also located at progressively increasing depth from left to right, so as to further assist in distributing the shocks, stresses and strains upon the blade.

Each tooth insert unit comprises an elongated metal plate 34, of the same gauge or thickness as the blade 26, and a pair of similar lighter gauge sheets 35 spot welded to opposite sides of the plate 34, as indicated at 36. The sheets 35 extend upward, above the top edge of the plate 34, forming a channel 37 adapted to receive the blade 26.

One end of the plate 34 extends outward beyond the sheets 35, as indicated at 38 in Fig. 6, forming a tongue to be received in the groove 39 at the opposite end of a similar unit. Each tooth is recessed as shown at 40 to receive hardened facings 41, of carboloy or similar material, which are welded in the recesses.

For the purpose of attaching the tooth insert units 32 to the blade 26, spaced apertures 42 are formed in the blade 26, preferably along the horizontal median line of the blade, and similarly spaced apertures 43 are formed in the sheet portions 35 of the tooth insert units, to receive roll pins 44 or similar fastening means.

When it is necessary to remove a tooth insert unit 32, in order to repair or replace the same, it is only necessary to drive the roll pins 44 out of the respective apertures, when the unit may be slidably moved downward out of engagement with the blade. The unit may be easily replaced by sliding it upward onto the blade 26 and inserting the roll pins 44.

It will be evident that the tongues 38 and grooves 39, upon opposite ends of the tooth insert units, provide for interlocking all of the units together throughout the length of the blade 26, and assure alignment of the teeth upon the several insert units.

If at any time it may be necessary or desirable to remove the entire blade 26, this may be easily and readily accomplished by backing off the thumb nuts 30 and removing the locking bars 28, and then backing off the set screws 31, when the blade 26 may be removed.

It will be seen that the back-up plates or blades 14 remain in position upon the gang saw frame of the machine at all times, and it is not necessary to disturb any of the back-up plates in order to remove or replace the corresponding blades 26.

It will also be evident that with this construction of relatively narrow saw blade backed up by a relatively wide back-up blade or plate, the narrow saw blade may be placed under considerable tension, stretching it so tightly that a perfectly straight cut will be produced thereby.

Furthermore, it will be evident that it should seldom be necessary to remove a blade 26, as any teeth which may need sharpening or replacing may be easily taken care of by removing and replacing the corresponding tooth insert unit or units while the blade 26 remains in position in the frame.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In combination with a gang saw frame, a saw blade for cutting stone, comprising an elongated relatively wide back-up plate, means connecting opposite ends of said back-up plate to the gang saw frame, an elongated relatively narrow saw blade, means independently connecting said saw blade under tension to the frame, and means holding the upper edge of the saw blade against the lower edge of the back-up plate.

2. In combination with a gang saw frame, a saw blade for cutting stone comprising an elongated relatively wide back-up plate, perpendicular structural members attached to opposite sides of said back-up plate at each end thereof and extending below the lower edge of said back-up plate, means attaching said structural members to the gang saw frame, an elongated relatively narrow saw blade located below and in contact with the back-up plate, opposite ends of said saw blade being located between said structural members, means upon the ends of said saw blade cooperating with said structural members for tightly stretching said saw blade, and means holding the upper edge of the saw blade against the lower edge of the back-up plate.

3. In combination with a gang saw frame, a saw blade for cutting stone comprising an elongated relatively wide back-up plate, perpendicular structural members attached to opposite sides of said back-up plate at each end thereof and extending below the lower edge of said back-up plate, means attaching said structural members to the gang saw frame, an elongated relatively narrow blade located below and in contact with the back-up plate, opposite ends of said saw blade being located between said structural members, blocks upon the ends of the saw blade, screws threaded through said blocks and engaging said structural members for tightly stretching said saw blade, and means holding the upper edge of the saw blade against the lower edge of the back-up plate.

4. In combination with a gang saw frame, a saw blade for cutting stone comprising an elongated relatively wide back-up plate, perpendicular structural members attached to opposite sides of said back-up plate at each end thereof and extending below the lower edge of said back-up plate, means attaching said structural members to the gang saw frame, an elongated relatively narrow saw blade located below and in contact with the back-up plate, opposite ends of said saw blade being located between said structural members, means upon the ends of said saw blade cooperating with said structural members for tightly stretching said saw blade, and locking bars attached to the lower ends of said structural members and engaging the lower edge of the saw blade for holding the upper edge thereof against the lower edge of the back-up plate.

5. In combination with a gang saw frame, a saw blade for cutting stone comprising an elongated relatively wide back-up plate, perpendicular structural members attached to opposite sides of said back-up plate at each end thereof and extending below the lower edge of said back-up plate, means attaching said structural members to the gang saw frame, an elongated relatively narrow saw blade located below and in contact with the back-up plate, opposite ends of said saw blade being located between said structural members, blocks upon the ends of the saw blade, screws threaded through said blacks and engaging said structural members for tightly stretching said saw blade, and locking bars attached to the lower ends of said structural members and engaging the lower edge of the saw blade for holding the upper edge thereof against the lower edge of the back-up plate.

References Cited in the file of this patent

UNITED STATES PATENTS 156,748     Andrews _____ Nov. 10, 1874

FOREIGN PATENTS 1,093,114     France _____ May 2, 1955